Feb. 26, 1957     G. E. LEADBETTER     2,782,805
CONDUIT AND METHOD OF MAKING SAME
Filed Nov. 24, 1952

INVENTOR.
GILBERT E. LEADBETTER
BY
Oberlin & Limbach
ATTORNEYS.

United States Patent Office 2,782,805
Patented Feb. 26, 1957

2,782,805

CONDUIT AND METHOD OF MAKING SAME

Gilbert E. Leadbetter, Mansfield, Ohio

Application November 24, 1952, Serial No. 322,295

6 Claims. (Cl. 138—74)

The present improvements relating, as indicated to conduits have more particular regard to plastic conduits made of a synthetic plastic composition, such for example as the cellulose acetate butyrate sold under the trademark "Tenite II." As is well known, this type of conduit is finding increasing use in domestic and industrial installations, primarily because the plastic successfully resists corrosion and its light weight makes the conduit easy to handle, particularly as compared to equivalent metal pipe. Plastic conduits, which may be used with or without additional reinforcing material such as concrete and the like, are generally formed to the desired cross-sectional shape and size in a continuous extrusion process and, therefore, may be cut in any suitable lengths. Between the manufacture and actual use of such lengths, there is normally shipment and storage thereof and while the light weight of the plastic greatly facilitates handling, the space required for those purposes is, as with other hollow objects, much greater than the effective volume of the material transported and stored.

It is a principal object of my invention to provide a plastic conduit which may be shipped and stored in an opened, generally flat condition, thereby permitting nesting of several lengths to conserve space, and yet readily closed to conduit gases or liquids at the place of use. It is also an object of the invention to provide a generally flat conduit-forming article adapted to be closed upon itself to form a conduit wherein the article when thus closed assume a predetermined cross-sectional shape. An additional object is to provide an article of this nature including means whereby it may be locked in closed or completed conduit condition. My invention has as a further object the provision of a method of making such an article. Other objects and advantages will appear as the following description proceeds.

To the accomplishment of the foregoing and related ends, my invention, then, comprises the features hereinafter fully described and particularly pointed out in the claims, the following description, and annexed drawing setting forth in detail certain illustrative embodiments of the invention, these being indicative, however, of but a few of the various ways in which the principle of the invention may be employed.

Figure 1:
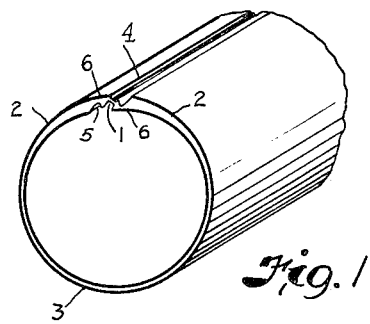
Fig. 1 is a perspective view of a blank of plastic material as formed to tubular shape in the first step of my method.
Figure 2:
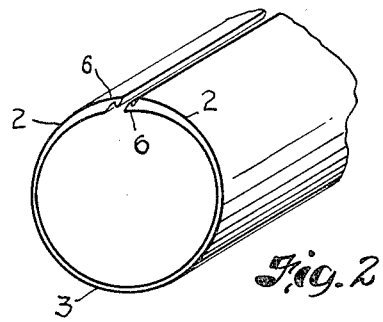
Fig. 2 is a similar view of the blank after the cutting operation which longitudinally separates it in the second step of the method.
Figure 3:
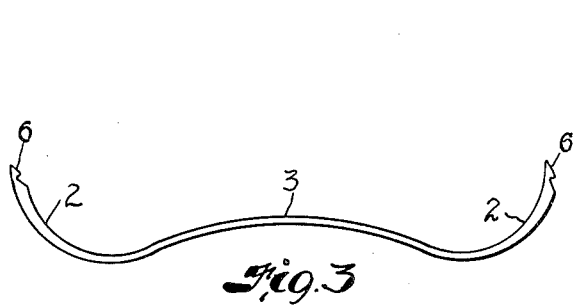
Fig. 3 is an end view of the finished conduit-forming article.

Referring now to the drawing in detail, the preferred method of making my conduit-forming article will be readily understood from a consideration of Figs. 1 to 3 which illustrate the article in successive stages of manufacture corresponding to the several steps of such method. Thus, the plastic material of which the article is made, such as cellulose acetate butyrate, is first extruded to produce an elongated blank having a cross-section as shown in Fig. 1 with a reduced, longitudinally-extending wall section 1 of relatively small circumferential extent, constituting, in effect, a thin web maintaining the material in tubular form.

To each side of this web, the wall thickness of the blank over a predetermined peripheral extent is such as to provide a normal working temperature relatively inflexible longitudinal portions 2, while the intermediate blank portion, indicated at 3, is of a substantially uniform, reduced thickness to be capable of flexure although self-supporting at normal temperatures. The portions 2 may be gradually tapered to the thickness of intermediate portion 3 as shown and will have a combined arcuate extent sufficient to dictate the general cross-sectional shape of the conduit formed by the finished article as more fully described below.

In the formation of the web 1, the blank is provided with a longitudinally-extending groove 4 in the outer surface thereof and a slightly offset, radially overlapping, longitudinal groove 5 in the inner surface, the web forming a common wall therebetween. These grooves are correspondingly shaped to provide locking members 6 held in spaced-apart relation by web 1 and adapted when interengaged to overlap each other both radially and circumferentially. It will be appreciated that conventional apparatus for extruding plastic material may be used in the initial step of my method with the die opening thereof conforming to the blank cross-section shown and described.

The extruded tubular blank is next longitudinally separated by cutting the web 1 to remove the same and thereby provide the blank with parallel longitudinal edges having the cooperable locking members 6 formed therein, as shown in Fig. 2. The cutting operation preferably closely follows extrusion of the blank, and while the material is still in a semi-plastic state, the cut blank is passed through suitable spreading apparatus which opens it to generally flat condition. Only the intermediate portion 3 of the blank, however, is flattened, the apparatus preserving the curvature of the thickened portions 2. The blank therefore will assume the shape shown in Fig. 3 which is that of the finished article.

The process of making this article is preferably continuous, as in the case of conventional plastic tubing, and the material similarly cut into lengths of any desired extent. While the end product is a generally flat article, I prefer to extrude the material initially as tubing rather than directly to final form since elongation of the material leaving the die, with resultant shrinkage, may be more readily compensated with the tubular form, thereby allowing closer tolerances to be held.

Figure 9:
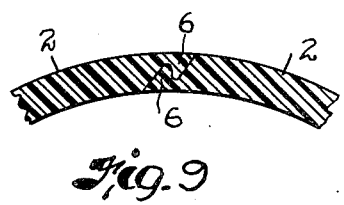
Fig. 9 is a partial transverse section on an enlarged scale showing the interlocking edge portions of the article.

It will be apparent from Fig. 3 that my conduit-forming article affords a substantial reduction in space requirements for transportation and storage as compared to preformed pipe, since several lengths thereof may be vertically stacked in nested relation. When it is desired to install a conduit using this article, the parallel longitudinal edges are brought together and interlocked by engagement of the locking members 6. Since the intermediate flattened portion 3 is capable of flexure while the correspondingly curved longitudinal edge portions 2 are relatively inflexible, portion 3 in transversely bending will tend to conform to the contour of the portions 2, and the total circumferential extent of these portions is such that the closed article will assume and maintain the original tubular form. In the illustrated construction, the locking members 6 are of reverse-S configuration, as most clearly shown in Fig. 9, thereby to overlap radially and circumferentially when engaged, but it will be apparent that this type of interlock may be realized with differently shaped locking members. Tightness of the longitudinal seam in the thus formed conduit is enhanced by the plastic memory of the material which urges it to return to its normal generally flat condition. Although it may be sufficient for certain applications to rely only upon the mechanical interlock of the edges, it is preferred that the seam be suitably cemented, for example by solvent welding.

Figure 4:
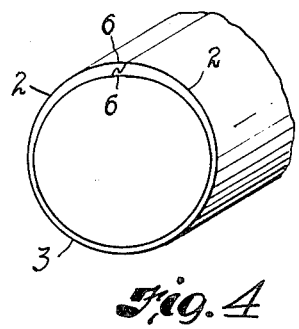
Fig. 4 is a perspective view of the article with its parallel longitudinal edges joined and interlocked to form a conduit.
Figure 5:
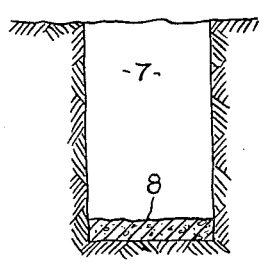
Figs. 5, 6 and 7 illustrate in vertical section successive stages in the formation of an underground concrete conduit utilizing the article of Fig. 4 as a plastic lining.
Figure 6:
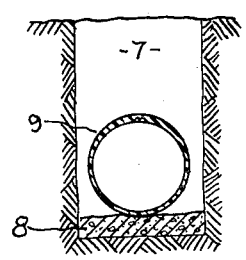
Figure 7:
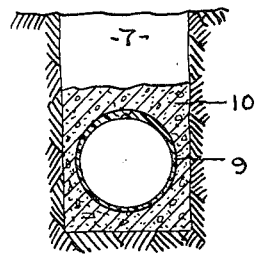
Figure 8:
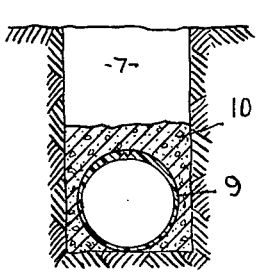
Fig. 8 is a vertical section of a different type of underground concrete conduit with a similar lining.

Dependent upon the particular use and fluid pressure involved, the conduit of Fig. 4 may be used by itself or with additional reinforcing materials such as concrete and the like. An underground concrete conduit 10 suitable for conducting liquid under pressure may be made by first preparing a ditch 7 and pouring a bottom layer of concrete 8 therein. The plastic conduit 9, brought to the ditch in generally flat condition and there finally formed and cemented as above described, is then placed on this bottom layer and further concrete poured in the ditch with member 9 serving as a mold for such additional concrete. Conduit 9 in this type of installation is completely surrounded by concrete, forming a plastic lining therefor, however, for some purposes, such as drainage, the bottom layer of concrete may be omitted as shown in Fig. 8 and member 9 placed directly on the bottom of the ditch.

Other modes of applying the principle of the invention may be employed, change being made as regards the details described, provided the features stated in any of the following claims, or the equivalent of such, be employed.

I therefore particularly point out and distinctly claim as my invention:

1. The method of making a conduit-forming article which comprises the steps of shaping resiliently deformable plastic material to the form of a tubular blank having a cross-sectional shape similar to that of the desired conduit and a thickened relatively inflexible wall section having formed therein spaced apart longitudinally extending cooperable locking members connected by a thin web of the material, cutting said web, and generally flattening the section of reduced thickness further to separate the thus formed edge portions and produce an open and spread article, such article being resiliently deformable to closed condition and maintainable in such state by interengagement of such locking members.

2. The method of making a conduit-forming article which comprises the steps of shaping resiliently deformable plastic material to the form of a tubular blank having a main body portion of a thickness such as to be capable of flexure and a relatively inflexible wall section of increased thickness relative to said main body portion, such thickened wall section having formed therein spaced apart longitudinally extending edges connected by a thin web of the material, cutting said web to free such edges, and spreading the cut blank to flatten said main body portion while preserving the curvature of the thickened edge portions, thereby to produce a generally open and spread blank which may subsequently by resilient deformation be closed longitudinally upon itself to form the desired conduit.

3. The method of making a conduit-forming article which comprises the steps of extruding resiliently deformable plastic material to form a tubular blank having a main body portion of a thickness such as to be capable of flexure and a relatively inflexible wall section of increased thickness relative to said main body portion, the extrusion further producing in such thickened wall section spaced apart longitudinally extending cooperable locking members connected by a thin web of the material, cutting said web to free such locking members, and spreading the cut blank while in plastic condition to flatten said main body portion without affecting the curvature of the thickened edge portions, whereby the resultant generally open article may subsequently be closed upon itself longitudnially and locked in such condition to form the desired conduit.

4. As a new article of manufacture, an elongated blank of resiliently deformable material having a longitudinal center section and having spaced-apart longitudinal edge portions of increased thickness and greater resistance to deformation with respect to the longitudinal center section of the blank therebetween, such center section having a slight transverse curvature and the thicker edge portions being curved correspondingly and reversely relative to the center section, such normally open blank being adapted to form a closed conduit having a longitudinal seam and a wall section of increased rigidity in the region thereof by a bringing together of the longitudinal edges of the blank in a direction to reverse the curvature of the center section.

5. As a new article of manufacture, an elongated blank of resiliently deformable material having a longitudinal center section and having spaced-apart longitudinal edge portions of increased thickness and greater resistance to deformation with respect to the longitudinal center section of the blank therebetween, such center section having a slight transverse curvature and the thicker edge portions being curved correspondingly and reversely relative to the center section, the extreme longitudinal edges being formed with interengageable locking elements, such normally open blank being adapted to form a closed conduit having a longitudinal seam and a well section of increased rigidity in the region thereof by a bringing together of the longitudinal edges of the blank in a direction to reverse the curvature of the center section, interengagement of said locking elements maintaining the blank in such closed conduit-forming condition.

6. The article set forth in claim 5 characterized further in that said locking elements comprise members for overlapping radially and circumferentially continuously along the length the blank when interengaged.

References Cited in the file of this patent

UNITED STATES PATENTS

| | | |
|---|---|---|
| 578,333 | Hilgeman | Mar. 9, 1897 |
| 811,793 | Reynolds | Feb. 6, 1906 |
| 1,485,994 | Salisbury | Mar. 4, 1924 |
| 1,520,840 | Murray | Dec. 30, 1924 |
| 1,661,069 | Hartung | Feb. 28, 1928 |
| 1,729,356 | Murray | Sept. 24, 1929 |
| 1,891,740 | Westerman | Dec. 20, 1932 |
| 1,933,279 | Quarnstrom | Oct. 31, 1933 |
| 1,965,953 | Curtix | July 10, 1934 |
| 2,212,169 | Rendle | Aug. 20, 1940 |
| 2,432,870 | Evalt | Dec. 16, 1947 |
| 2,645,816 | Trussell | July 21, 1953 |
| 2,668,987 | Harris et al. | Feb. 16, 1954 |

FOREIGN PATENTS

| | | |
|---|---|---|
| 424,293 | Great Britain | Feb. 19, 1935 |
| 620,901 | Great Britain | Mar. 31, 1949 |

OTHER REFERENCES

Machine Design, pages 126–128, September 1943. (Copy in Div. 52.)